US008228580B2

(12) United States Patent
Arai et al.

(10) Patent No.: US 8,228,580 B2
(45) Date of Patent: Jul. 24, 2012

(54) OPTICAL SCANNER AND IMAGE FORMING APPARATUS INCLUDING A COMMON OPTICAL DEFLECTOR AND SYNCHRONIZATION DETECTOR

(75) Inventors: Nobuyuki Arai, Ebina (JP); Yoshinori Hayashi, Kawasaki (JP); Naoto Watanabe, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 623 days.

(21) Appl. No.: 12/119,859

(22) Filed: May 13, 2008

(65) Prior Publication Data

US 2008/0285104 A1 Nov. 20, 2008

(30) Foreign Application Priority Data

May 14, 2007 (JP) .................................. 2007-128272

(51) Int. Cl.
  *G02B 26/08* (2006.01)
(52) U.S. Cl. ............... 359/204.1; 359/204.2; 359/205.1; 359/216.1
(58) Field of Classification Search ............... 359/204.1, 359/204.2, 204.4, 205.1, 212.1, 212.2, 216.1, 359/219.1, 217.1, 223.1, 226.1; 347/234, 347/235, 243, 250, 260, 261; 250/215, 216, 250/236, 491.1
See application file for complete search history.

(56) References Cited

U.S. PATENT DOCUMENTS

| 6,462,853 | B2 | 10/2002 | Hayashi |
| 6,587,245 | B2 | 7/2003 | Hayashi |
| 6,657,765 | B2 | 12/2003 | Hayashi et al. |
| 6,757,089 | B2 | 6/2004 | Hayashi |
| 6,768,506 | B2 | 7/2004 | Hayashi et al. |
| 6,771,296 | B2 | 8/2004 | Hayashi et al. |
| 6,771,407 | B2 | 8/2004 | Hayashi et al. |
| 6,788,444 | B2 | 9/2004 | Suzuki et al. |
| 6,803,941 | B2 | 10/2004 | Hayashi et al. |
| 6,822,666 | B2 * | 11/2004 | Kato ............................. 347/235 |
| 6,903,856 | B2 | 6/2005 | Hayashi |
| 6,906,739 | B2 | 6/2005 | Suzuki et al. |

(Continued)

FOREIGN PATENT DOCUMENTS

JP   4-313776   11/1992

(Continued)

OTHER PUBLICATIONS

Office Action issued Jun. 14, 2011, in Japanese Patent Application No. 2007-128272.

*Primary Examiner* — Frank Font
(74) *Attorney, Agent, or Firm* — Oblon, Spivak, McClelland, Maier & Neustadt, L.L.P.

(57) ABSTRACT

An optical scanner includes a plurality of scanning optical systems each of which scans a different surface to be scanned and includes a light source configured to emit a light beam, an optical deflector having a plurality of reflection surfaces, and a synchronization detector configured to receive the light beam deflected by the optical deflector and detect a timing to scan an effective area of the surface to be scanned with the deflected light beam before a scanning is started or after the scanning is completed. The synchronization detector of one of a pair of scanning optical systems is disposed on a scanning end side to determine the scanning timing, and the synchronization detector of the other one of the pair of scanning optical systems is disposed on a scanning start side to determine the scanning timing.

9 Claims, 11 Drawing Sheets

U.S. PATENT DOCUMENTS

| | | | |
|---|---|---|---|
| 6,934,061 B2 | 8/2005 | Ono et al. | |
| 6,956,685 B2 | 10/2005 | Hayashi | |
| 6,987,593 B2 | 1/2006 | Hayashi et al. | |
| 7,006,120 B2 | 2/2006 | Sakai et al. | |
| 7,050,082 B2* | 5/2006 | Suzuki et al. | 347/241 |
| 7,050,210 B2 | 5/2006 | Atsuumi et al. | |
| 7,068,296 B2 | 6/2006 | Hayashi et al. | |
| 7,088,484 B2 | 8/2006 | Hayashi et al. | |
| 7,106,483 B2 | 9/2006 | Hayashi et al. | |
| 7,145,705 B2 | 12/2006 | Hayashi | |
| 7,218,432 B2 | 5/2007 | Ichii et al. | |
| 7,236,281 B2* | 6/2007 | Hayashi et al. | 359/204.1 |
| 7,253,937 B2 | 8/2007 | Ueda et al. | |
| 7,271,823 B2 | 9/2007 | Izumi et al. | |
| 7,355,765 B2 | 4/2008 | Yoshida | |
| 7,518,627 B2* | 4/2009 | Iwamoto | 347/238 |
| 7,826,116 B2* | 11/2010 | Itabashi | 359/205.1 |
| 2004/0036936 A1 | 2/2004 | Nakajima et al. | |
| 2006/0077500 A1 | 4/2006 | Hayashi et al. | |
| 2006/0232659 A1 | 10/2006 | Hayashi et al. | |
| 2006/0245009 A1 | 11/2006 | Akiyama et al. | |
| 2006/0284968 A1 | 12/2006 | Hayashi et al. | |
| 2007/0058255 A1 | 3/2007 | Imai et al. | |
| 2007/0211324 A1 | 9/2007 | Sakai et al. | |
| 2007/0253048 A1 | 11/2007 | Sakai et al. | |
| 2008/0025759 A1 | 1/2008 | Ichii et al. | |
| 2008/0055692 A1 | 3/2008 | Saisho et al. | |
| 2008/0068689 A1 | 3/2008 | Saisho et al. | |
| 2008/0068693 A1 | 3/2008 | Hayashi et al. | |
| 2009/0290205 A1* | 11/2009 | Satoh et al. | 359/199.2 |
| 2011/0012983 A1* | 1/2011 | Itabashi | 347/232 |

FOREIGN PATENT DOCUMENTS

| | | |
|---|---|---|
| JP | 2001-121739 | 5/2001 |
| JP | 2004-4510 | 1/2004 |
| JP | 2004-85969 | 3/2004 |

* cited by examiner

OPTICAL SCANNER AND IMAGE FORMING APPARATUS INCLUDING A COMMON OPTICAL DEFLECTOR AND SYNCHRONIZATION DETECTOR

CROSS REFERENCE TO RELATED APPLICATIONS

The present application is based on and claims priority from Japanese Application Number 2007-128272, filed on May 14, 2007, the disclosure of which is hereby incorporated by reference herein in its entirety.

BACKGROUND OF THE INVENTION

1. Field of the Invention

The present invention relates to an optical scanner installed in an image forming apparatus in an electrophotographic system, and to an image forming apparatus such as a laser printer, a laser plotter, a digital copying machine, a plain paper facsimile, or a complex machine thereof, using the optical scanner.

2. Description of the Related Art

Recently, in an image forming apparatus in an electrophotographic system, which is known as a laser printer, the demands for a laser plotter, a digital copying machine, a plain paper facsimile, or a complex machine thereof, full-color, high quality, high speed, small size, and low cost have increased. In order to achieve such high speed in image forming by the image forming apparatus, image forming apparatuses in a tandem system, in which a plurality of photoconductors as image carriers, normally four photoconductors, are provided have come into wide use. In the tandem system image forming apparatus, for example, four photoconductors are disposed in parallel along a transfer belt or an intermediate transfer belt configured to convey a recording medium. After each photoconductor is charged by a corresponding charging unit, a latent image is formed on each photoconductor by a writing unit, and then the latent image formed on each photoconductor is developed with a developer corresponding to a different color (for example, yellow, magenta, cyan, or black) by a corresponding development unit to be visualized as a toner image. The toner image corresponding to each color is transferred in a superimposed state on a recording medium fed by the transfer belt or the intermediate transfer belt to form a color image.

As the writing unit used in such a tandem system image forming apparatus, an optical scanner is known in which surfaces to be scanned are disposed at opposite sides of an optical deflector commonly-used in a plurality of optical systems, and light beams are emitted from both sides of the optical deflector to scan the surfaces is known. According to the above configuration, exposures of four colors, for example, yellow, magenta, cyan, black can be performed substantially at the same time so that high-speed of the image forming can be achieved.

In the case of the optical scanner in which the surfaces to be scanned are disposed at the opposite sides of the commonly-used optical deflector, when a synchronization detection is performed before writing, the light beams to scan the surfaces to be scanned are received by a light-receiving element prior to the start of writing in order to perform writing start synchronization. If the optical deflector is commonly-used by the plurality of scanning optical systems, one surface to be scanned is scanned in a reverse direction of a direction where the opposite surface to be scanned is scanned, that is, a writing start position in each scanning optical system is disposed at a reverse side with respect to a plane which passes a rotational center of the optical deflector and perpendicular to the surfaces to be scanned.

Accordingly, the light-receiving elements of the scanning optical systems disposed at the opposite sides of the optical deflector are disposed at opposite sides in the optical scanner. In the above-described configuration, four light paths are confusingly disposed in the optical scanner such that their arrangement is complicated and it is difficult to achieve a small size apparatus without interference. In particular, light paths for the synchronization detection need to be provided out of the effective scanning area in the main scanning direction. The number of optical elements required to perform the synchronization detection is preferably as few as possible to achieve a small size and low cost device. However, if the number of optical elements is reduced, it is necessary to prevent degradation of image quality, which is caused by degradation of optical properties. In the above-described scanning optical systems, it is necessary to ensure wide areas to perform the synchronization detection in relation to effective scanning widths. For example, if in both of the two oppositely disposed scanning optical systems, the synchronization detection is performed before scanning, as shown in FIG. 2, right-hand and left-hand scanning optical systems are mutually deviated from each other so that a wide exposure width is required. Therefore, a large size optical deflector is required, making it difficult to achieve high speed and long-term performance and there is a problem in that noise is generated due to rotation of the optical deflector.

To solve the above problems, in conventional technology, the following improvements have been made.

Japanese Patent Application Publication Number 2004-85969 discloses an optical scanner having a plurality of scanning optical systems to scan different surfaces to be scanned. In this case, in the pair of scanning optical systems, reference reflection positions, each of which is defined as a position of the reflection surface of the optical deflector, where the light beam reflected on the reflection surface of the optical deflector is perpendicular to the surface to be scanned, are asymmetric with respect to a reference plane which includes a rotational axis of the optical deflector and is parallel to both surfaces to be scanned. The scan lenses of the pair of scanning optical systems are symmetric with respect to a line which passes a rotational center of the optical deflector and which is parallel to the surfaces to be scanned. That is, both pairs of scanning optical systems are configured to perform the synchronization detection before scanning and the reference reflection positions of the pair of scanning optical systems are mutually asymmetric with respect to the reference plane. However, the reflection positions of the scanning optical systems are different, and therefore distances from the rotational center to the reflection surfaces are different so that the positional deviation of a beam spot in the main scanning direction due to the effect of sags and degradation of a curvature of an image in the main and sub scanning directions occur causing degradation of the output image.

Japanese Patent Application Publication Number H04-313776 discloses a prior art in which the synchronization detection is performed by a light-receiving element to determine a writing start position. That is, based on positional information on one writing start position, the other three writing start positions are determined. In this method, although only one light-receiving element is provided so that layout freedom increases, variations in wavelength of the different light sources are not considered and time intervals become large so that accuracy is degraded and variations in writing start positions cause color deviations in an output image.

In the related arts described above, in the optical scanner in which scanning is performed at opposite sides of the optical deflector, it is not possible to obtain an optical scanner which performs high-quality writing while providing layout freedom of the light-receiving element to perform synchronization detection.

SUMMARY OF THE INVENTION

An object of the present invention is to provide an optical scanner in which layout freedom of optical systems is increased, and positional deviation of beam spots in a main scanning direction and degradation of curvature of an image in the main scanning direction and a sub scanning direction are prevented, so that high-quality writing can be performed.

To achieve the above object, an optical scanner according to an embodiment of the present invention includes a plurality of scanning optical systems, each of which scans a different surface to be scanned and includes a light source configured to emit a light beam, an optical deflector having a plurality of reflection surfaces each reflecting the light beam emitted from the light source to scan the surface, and a synchronization detector configured to receive the light beam deflected by the optical deflector and detect a timing to scan an effective area of the surface to be scanned with the deflected light beam before scanning is started or after the scanning is completed. The optical deflector is commonly used in the plurality of scanning optical systems. The plurality of scanning optical systems are formed by at least one pair of scanning optical systems disposed on opposite sides of the optical deflector to each other. The synchronization detector of one of the pair of scanning optical systems is disposed on a scanning end side where the scanning of the effective area of the surface to be scanned is finished to determine the scanning timing, and the synchronization detector of the other one of the pair of scanning optical systems is disposed on a scanning start side where the scanning of the effective area of the surface to be scanned is started to determine the scanning timing.

DETAILED DESCRIPTION OF THE PREFERRED EMBODIMENTS

Figure 1:
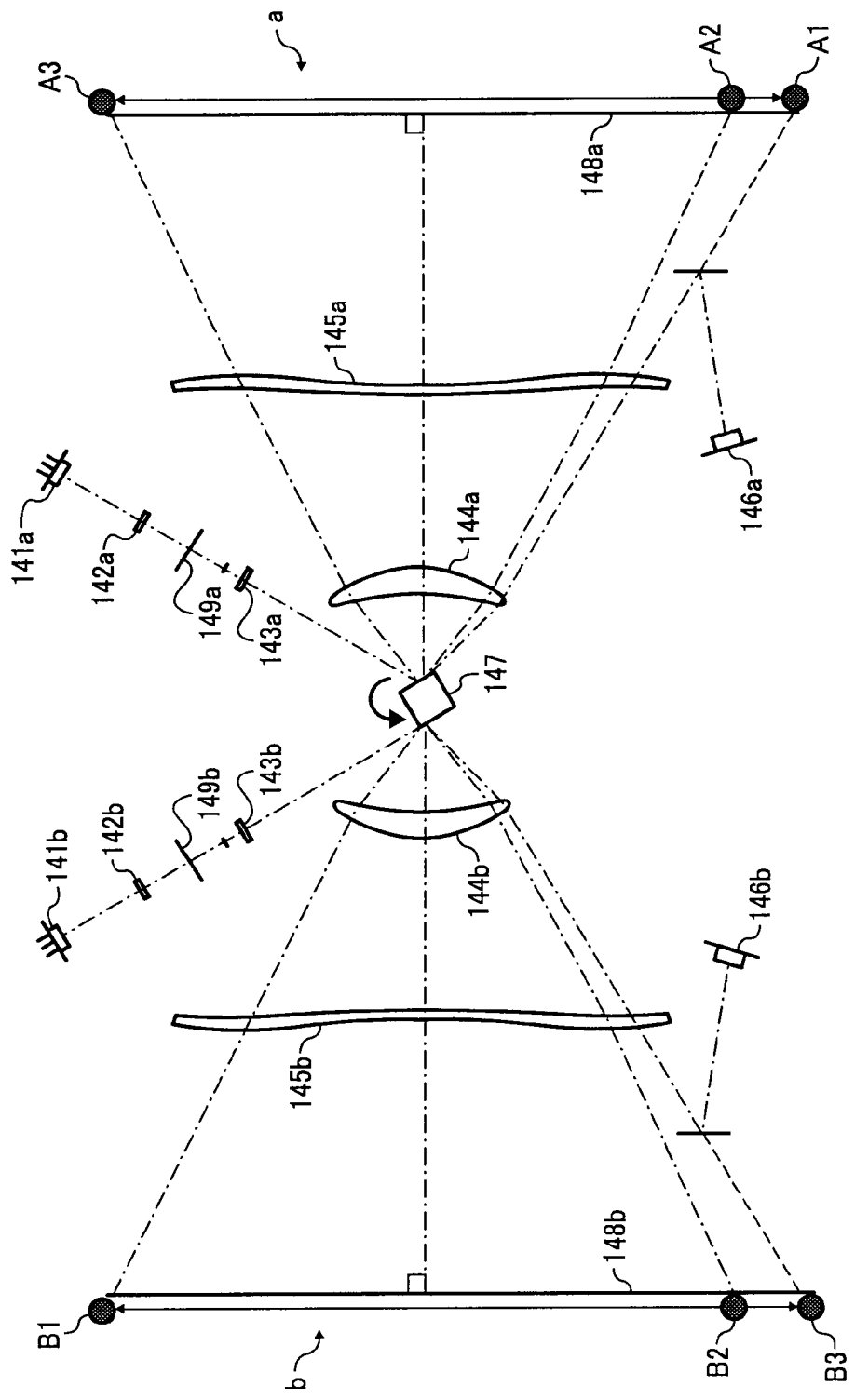
FIG. 1 is a plan view illustrating an optical scanner according to an embodiment of the present invention.

Preferred embodiments of the present invention will be described in detail with reference to the accompanying drawings below.

An optical scanner according to an embodiment of the present invention will be described with reference to FIG. 1. The optical scanner includes a plurality of scanning optical systems, each of which scans a different surface 148a, 148b to be scanned. In this embodiment, the optical scanner includes two scanning optical systems a, b, which are illustrated on right and left hand sides, respectively, in FIG. 1. Each of the scanning optical systems a, b includes a light source 141a, 141b configured to emit a light beam, an optical deflector 147 having a plurality of reflection surfaces each reflecting the light beam emitted from the light source, such as a semiconductor laser to scan the surface 148a, 148b, and a synchronization detector as a light-receiving element, for example, a photodiode 146a, 146b configured to receive the light beam deflected by the optical deflector 147 and detect a timing to scan an effective area of the surface 148a, 148b with the deflected light beam when scanning is started or when the scanning is completed. The optical deflector 147 is commonly used in the plurality of scanning optical systems a, b. The plurality of scanning optical systems a, b are formed by at least one pair of scanning optical systems a, b disposed on opposite sides of the optical deflector 147 to each other. The synchronization detector 146b of one of the pair of scanning optical systems 146a, 146b is disposed on a scanning end side where the scanning of the effective area of the surface 148b is finished to determine the scanning timing, and the synchronization detector 146a of the other one of the pair of scanning optical systems 146a, 146b is disposed on a scanning start side where the scanning of the effective area of the surface 148a is started to determine the scanning timing.

Each of the scanning optical systems further includes a coupling lens 142a, 142b, an aperture 149a, 149b, a cylindrical lens 143a, 143b, a first scan lens 144a, 144b, and a second scan lens 145a, 145b.

In this embodiment, the optical deflector 147 is a polygon mirror having four reflection surfaces and the above optical components are the same in both scanning optical systems a, b. The polygon mirror 147 is rotated at high speed in an anticlockwise direction of FIG. 1 to scan the surface 148a, 148b with the light beam emitted from the light source.

Furthermore, in this embodiment, the synchronization detectors 146a, 146b of the pair of scanning optical systems a, b are disposed on opposite sides of the optical deflector 147 in a symmetrical state with respect to a plane which passes a rotational center of the optical deflector and is parallel to the surfaces 148a, 148b to be scanned.

Although each of the scanning optical systems includes one light source 141a, 141b in the illustrated example, each of the scanning optical systems may include a plurality of light sources, or a light source configured to emit a plurality of light beams. Furthermore, although in the illustrated example, two scanning optical systems are disposed on opposite sides of the polygon mirror 147, a plurality of pairs of scanning optical systems can be disposed with intervals therebetween in a sub or vertical direction (see the configuration shown in FIG. 4).

The two scanning optical systems are disposed as a pair such that main scanning directions of the scanning light beams thereof are substantially parallel to each other. That is, the light beams emitted from the light sources 141a, 141b shown in the upper side of FIG. 1 onto the polygon mirror 147 are reflected rightward and leftward, respectively. The surfaces 148a, 148b to be scanned, each of which is in the main scanning direction, are substantially parallel to each other.

Divergent fluxes of the light beam emitted from each of the semiconductor lasers 141a, 141b are coupled by each of the coupling lenses 142a, 142b to be in a preferred beam form adapted to a subsequent optical system.

The light beams coupled by the coupling lenses 142a, 142b are in the same beam form, and may be in a parallel beam form or in a convergent or divergent beam form.

The light beam which has passed through each of the coupling lenses 142a, 142b passes through the aperture 149a, 149b so that an outer periphery of the light beam is cut off. The beam, after being shaped as described above, is imaged as a line image extending in the main scanning direction in the vicinity of the reflection surface of the polygon mirror 147 by the cylindrical lens 143a, 143b as an imaging lens having a positive power only in the sub scanning direction.

Each light beam deflected by the polygon mirror 147 passes through the first scan lens 144a, 144b and the second scan lens 145a, 145b and is emitted onto the surface 148a, 148b such as a surface of a photoconductor as an image carrier. The light beam is imaged as a light spot on the surface 148a, 148b to be scanned and the surface 148a, 148b is scanned with the light beam in the main scanning direction at a substantially constant speed.

The synchronization detector 146a of the scanning optical system a is configured to perform a synchronization detection before the scanning is started and the synchronization detector 146b of the scanning optical system b is configured to perform a synchronization detection after the scanning is completed. In the scanning optical system a, the light beam deflected with an angle to be directed toward A1 on the surface 148a is emitted into the light-receiving element 146a as the synchronization detector. Writing is started from a writing-start position A2 and completed at a writing-stop position A3. The writing-start position A2 is determined as a scanning position after a predetermined time passes from the time when the light-receiving element 146a receives the deflected light beam, and the writing-stop position A3 is determined as a scanning position after a further predetermined time.

On the other hand, in the scanning optical system b, the surface 148b is scanned from B1 to B2, and after the writing is completed, the light beam deflected with an angle to be directed toward B3 on the surface 148b is emitted into the light-receiving element 146b. The light-receiving element 146b performs a synchronization detection to determine a timing to start to scan the surface 148b from the position B1.

Figure 3A:
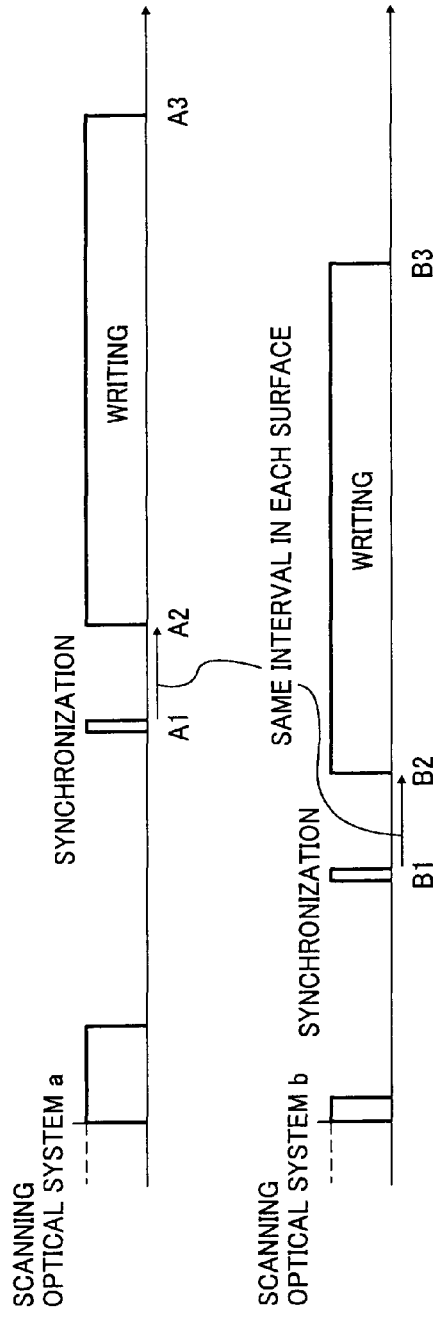
FIG. 3A is a timing chart of synchronization detections and writing in a conventional optical scanner.
Figure 3B:
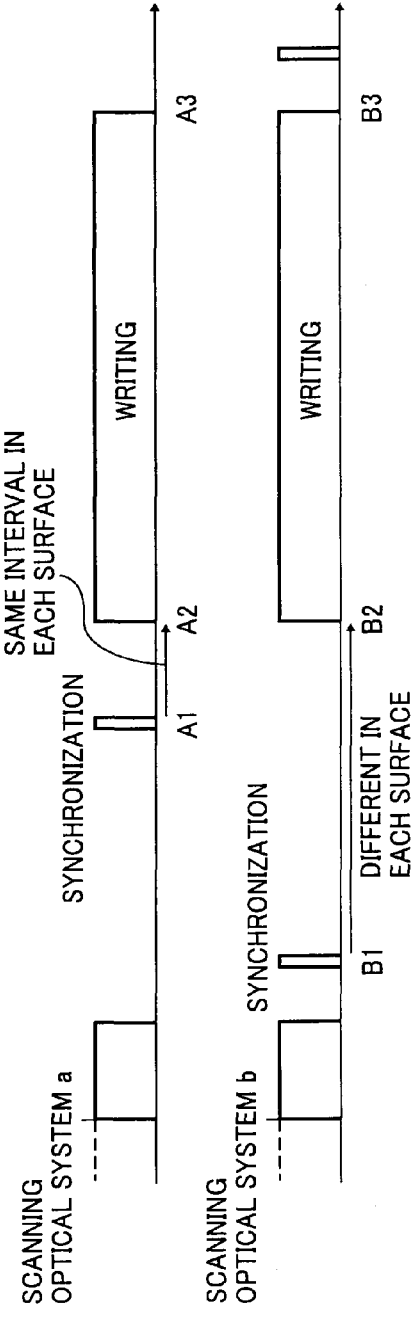
FIG. 3B is a timing chart of synchronization detections and writing in an optical scanner according to an embodiment of the present invention.

FIGS. 3A and 3B are timing charts each illustrating a timing of the synchronization detection and the writing by the conventional scanning optical system and the scanning optical system according to an embodiment of the present invention, respectively. As shown in FIG. 3A, in the conventional scanning optical system, the synchronization is performed before the scanning is started in each of the scanning optical systems a, b. Due to such a general configuration, the time from when the synchronization is performed to when the writing is started, that is, from A1 to A2 and from B1 to B2 in FIG. 3A, is constant regardless of the reflection surfaces of the polygon mirror. On the other hand, due to the configuration according to an embodiment of the present invention, as shown in FIG. 3B, the synchronization in the scanning optical system a is performed before the scanning is started as well as the above-described conventional configuration, although the timing of the writing from the synchronization in the scanning optical system b is different from that in the conventional optical system b. The synchronization in the scanning optical system b according to an embodiment of the present invention is performed, as an example, immediately after the writing is completed to determine a writing start timing from the next reflection surface of the polygon mirror 147. However, in a case where the synchronization after the writing is completed is performed, if a constant time from when the synchronization is performed to when the writing by the next reflection surface of the polygon mirror 147 is started is predetermined, the writing timings vary depending on the surfaces of the polygon mirror 147 because of variation of lengths of the reflection surfaces of the polygon mirror 147, so that the formed image is affected by the variation. Therefore, in this embodiment of the present invention, the lengths of the reflection surfaces of the polygon mirror 147 are memorized based on timings of synchronizations in a cycle, and an emitting timing of the light source can be controlled such that the writing is started from the predetermined position based on the memorized length of the reflection surface.

Figure 2:
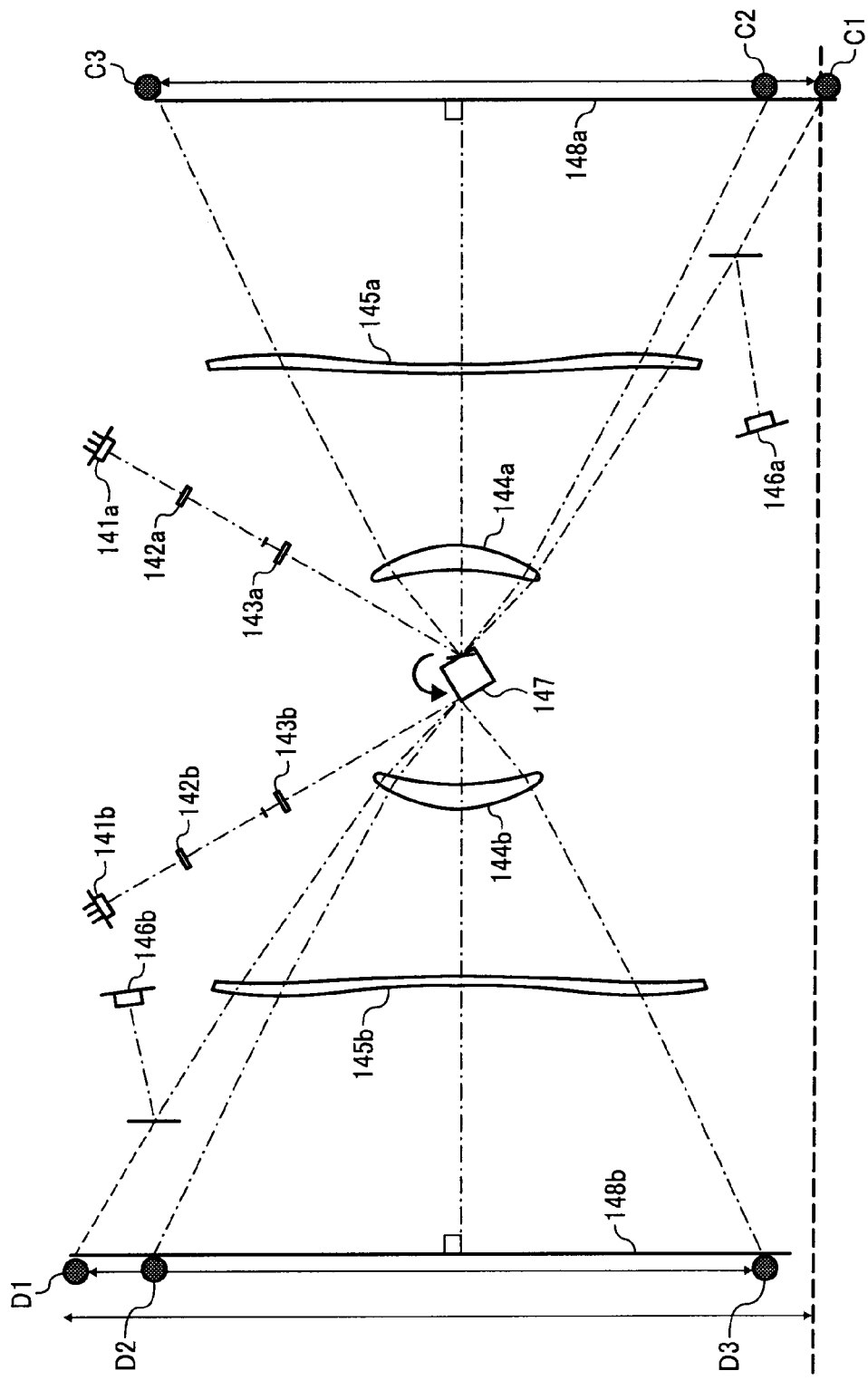
FIG. 2 is a view illustrating an optical arrangement of optical systems of a conventional optical scanner.

Next, advantageous effects achieved by the configuration of the embodiment of the present invention, which is shown in FIG. 1, are explained. FIG. 2 is a view illustrating a conventional example of the arrangement of the scanning optical systems in the optical scanner. In this example, in both scanning optical systems, the synchronization detection is performed before the scanning is started. The configuration shown in FIG. 2 is the same as that shown in FIG. 1 except for the arrangement of the light-receiving elements 146a, 146b. The two scanning optical systems c, d are illustrated on the right-hand side and left-hand side of FIG. 2, respectively. The synchronization detection is performed when the scanning is started in both of the two scanning optical systems c, d, and therefore, as shown in this figure, the area from C1 to C3 is positioned so as to deviate in the main scanning direction from the area from D1 to D3, so that a required exposure width is larger than that of the optical scanner shown in FIG. 1. This results in a large-sized optical scanner. This also results in a large size polygon mirror 147, so that it is difficult to rotate the polygon mirror at high speed and to achieve a long life thereof, and there is a problem in that the rotation of the polygon mirror causes noise. On the other hand, with the configuration of the optical scanner according to the embodiment of the present invention, as shown in FIG. 1, the above problems caused in the conventional example can be solved.

EXAMPLE

Next, an example of the optical scanner and the image forming apparatus according to the present invention will be explained.

Figure 4:
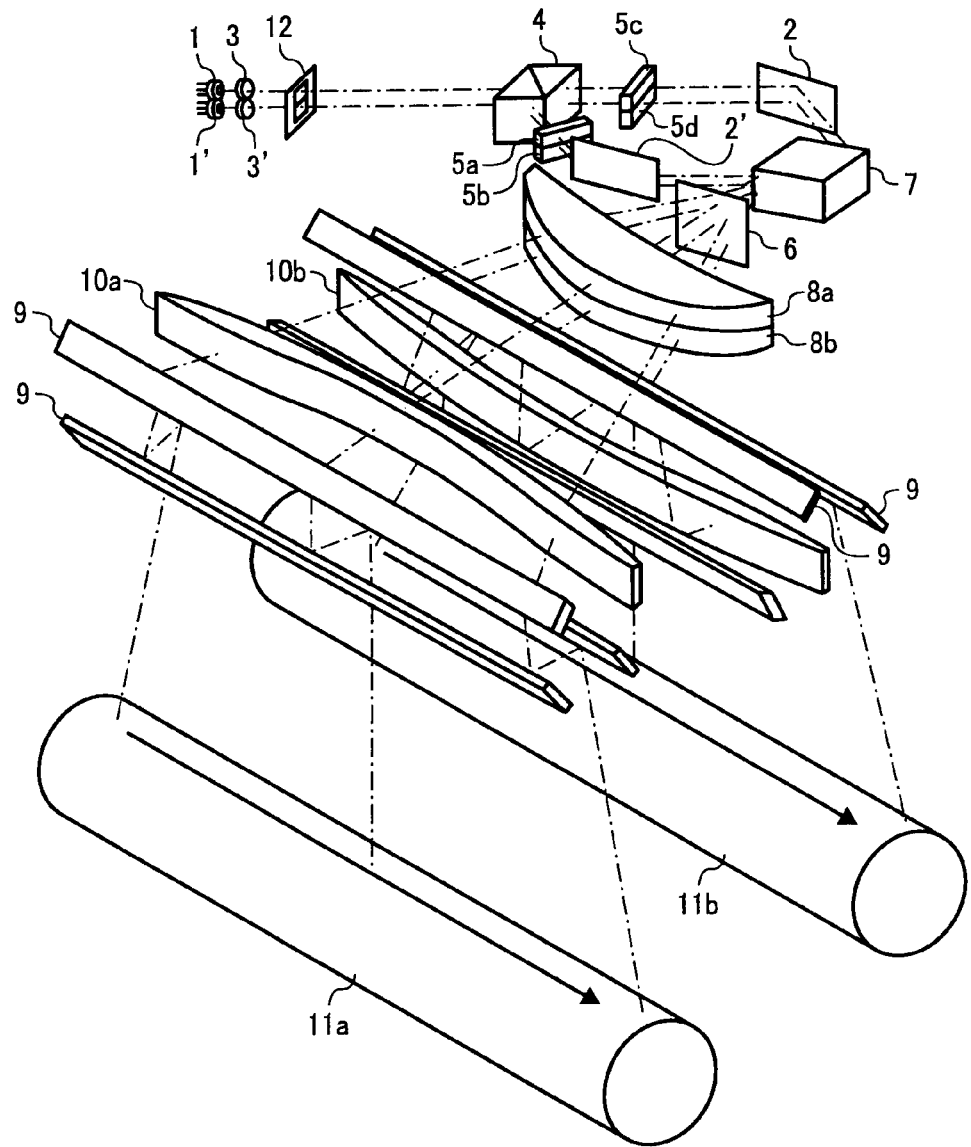
FIG. 4 is a schematic perspective view illustrating an optical scanner according to an embodiment of the present invention.

FIG. 4 is a schematic perspective view illustrating an example of the optical scanner according to the present invention. The optical scanner includes semiconductor lasers (LD) 1, 1', incident mirrors 2, 2', coupling lenses 3, 3', a half-mirror prism 4 as a light-flux dividing unit, cylindrical lenses 5a, 5b, 5c, 5d, a sound-proof glass 6, an optical deflector 7 such as a polygon mirror having four reflection surfaces, a first scan lens 8 (8a, 8b), optical path holding mirrors 9, a second scan lens 10 (10a, 10b), photoconductors 11a, 11b such as surfaces to be scanned, that is, image carriers, and an aperture 12.

Two divergent light fluxes emitted from the semiconductor lasers 1, 1' are converted into weak convergent light fluxes, parallel fluxes, or weak divergent light fluxes. The light beams from the coupling lenses 3, 3' pass through the aperture 12 to stabilize a beam diameter on the surfaces to be scanned and then are emitted into the half-mirror prism 4. Each of the beams emitted from the common light source into the half-mirror prism 4 is divided into two light fluxes so that four light beams in total exit from the half-mirror prism 4. In this case, since the light sources 1, 1' are disposed so as to deviate only in the sub scanning direction, the half-mirror prism 4 is commonly-used and the two light beams disposed in the sub scanning direction are divided into four light beams.

In addition, although the scanning optical systems are disposed only at one side of the optical deflector 7 in FIG. 4, the scanning optical systems are also disposed at an opposite side of the deflector 7 (see FIG. 1).

Figure 5:
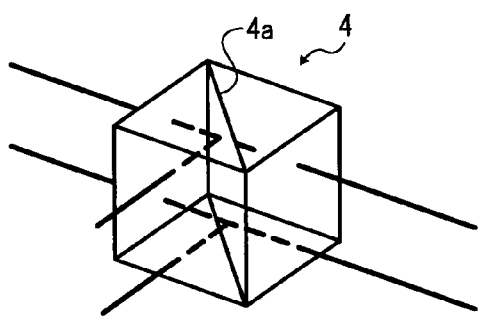
FIG. 5 is a schematic perspective view illustrating an optical scanner according to an embodiment of the present invention.

FIG. 5 is a perspective view illustrating a configuration example of the half-mirror prism 4 as an example of the light-flux dividing unit. The half-mirror prism 4 has a half mirror 4a to divide the emitted light into a transmitted light and a reflection light in the proportion of one to one. In addition, the proportion to divide the emitted light by the half mirror 4a does not necessarily need to be one-to-one, and the proportion can be adjusted to the setting conditions of the other optical systems.

Each of the light beams which exits from the half-mirror prism 4 is converted into a line image extending in the main scanning direction in the vicinity of the reflection surface of the polygon mirror 7 by the cylindrical lenses 5a, 5b (5c, 5d) respectively disposed in upper and lower stages.

Figure 6B:
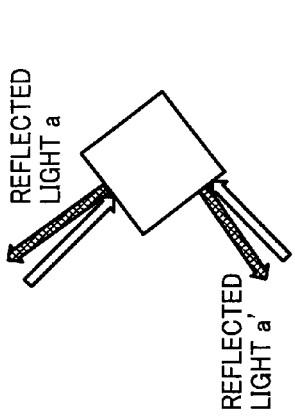
FIGS. 6A to 6D are views illustrating scanning by divided light beams.
Figure 6C:
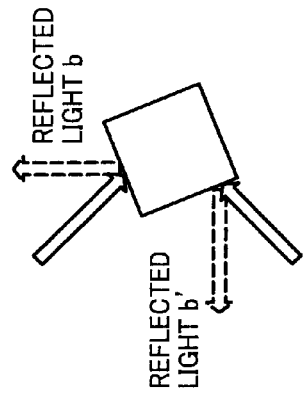
Figure 6D:
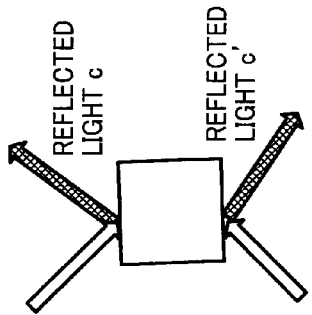
Figure 6A:
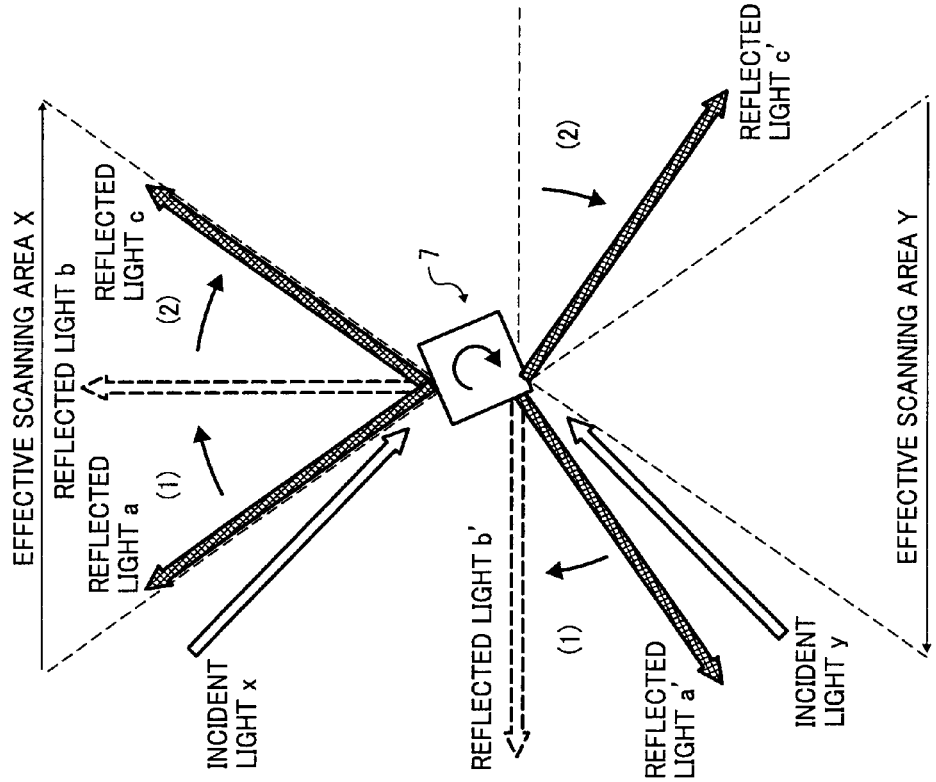

FIGS. 6A to 6D are views explaining a scanning by the divided light beam. As shown in FIG. 6A, the incident light x, y each emitted from the common light source and divided by the half-mirror prism 4 is emitted into the different surfaces of the optical deflector 7 (in this figure, the polygon mirror having four reflection surfaces) by adjusting the light paths through the incident mirrors 2, 2'. In this embodiment, the light beams are disposed so as to have a phase difference of substantially π/2 (90 degrees). In the case where the phase difference is about 90 degrees, each of the divided light fluxes is not used at a time to scan an effective area of the surface to be scanned. As an example, the reflection light shown in a lower side of FIG. 6A will be explained below for when the effective area X shown in an upper side of FIG. 6A, that is, when the effective area is scanned with the reflection light a to the reflection light c via the reflection light b.

When the incident light x is reflected as shown by the reflection light a, the reflection light a' does not enter the effective scanning area because of the phase difference of 90 degrees, as shown in FIG. 6B. When the deflector 7 is rotated and then the incident light x is reflected as shown by the reflection light b, the reflection light b' does not enter the effective scanning area, as shown in FIG. 6C. When the deflector 7 is further rotated and then the incident light x is reflected as shown by the reflection light c, the reflection light c' does not enter the effective scanning area, as shown in FIG. 6D. That is to say, from the case shown in FIG. 6B to the case shown in FIG. 6D, the reflection light shown in the lower side of these figures does not enter the effective scanning area. This is caused because the incident light beams have the phase difference of 90 degrees therebetween, and the deflector 7 has the four reflection surfaces so that the reflection light beams inevitably have a phase difference of 90 degrees. When the effective scanning area X is scanned with the incident light x, the effective scanning area Y is scanned with the incident light y, and it is obvious from what is described above, that a relationship between the incident light x and y not to scan the effective scanning area Y when the effective scanning area X is scanned is ensured even when the phase difference is slightly deviated from 90 degrees. On the other hand, when the effective scanning area Y is scanned with the incident light y, outside of the effective scanning area X is scanned with the incident light x and it is obvious from the symmetrical configuration that the corresponding photoconductor is not scanned.

Figure 7:
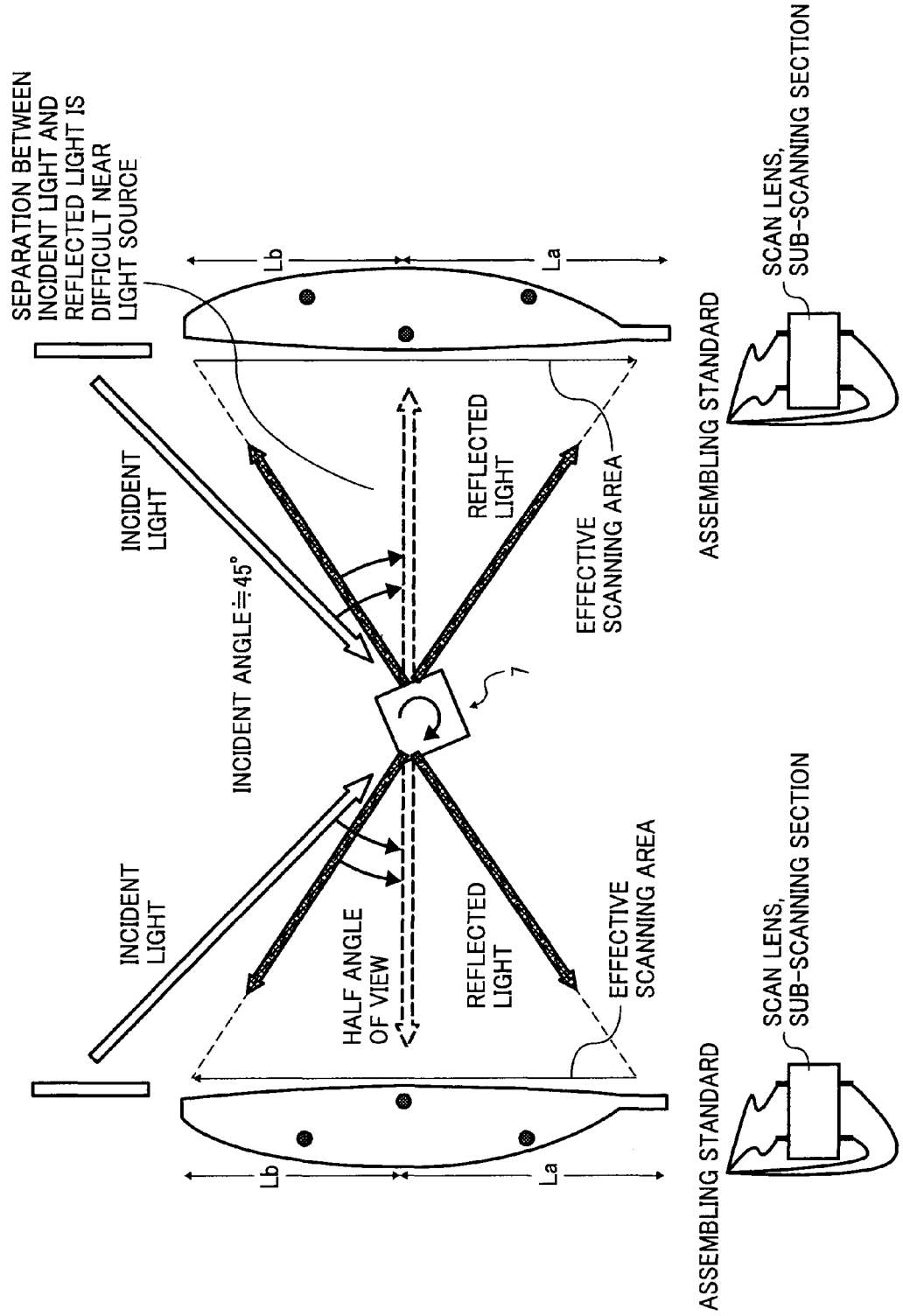
FIG. 7 is a view illustrating a relationship between incident light beams emitted into an optical deflector and scanning light beams (reflected light beams) emitted from the optical deflector.

In addition, a modulated drive of the light source is performed based on image information corresponding to a color, for example, magenta when the effective scanning area X is scanned with the incident light x. A modulated drive of the light source is performed based on image information corresponding to another color, for example, black when the effective scanning area Y is scanned with the incident light y so that the scanning of the images corresponding to two colors can be performed with the commonly-used light source FIG. 7 shows a relationship between the incident light entering the optical deflector 7 and the scanning light deflected by the optical deflector 7 as the reflection light in this figure. In the conventional and general optical system, an incident angle which is defined as an angle formed between a direction perpendicular to the surface to be scanned and the incident light is about 55 to 70 degrees. On the other hand, in this embodiment of the present invention where the phase difference is 90 degrees, the incident angle is 45 degrees. Moreover, the half angle of view in the general scanning optical system is 35 to 40 degrees so that it is ensured that a difference between the incident angle of the scanning light and the half angle of view is 15 to 35 degrees. On the other hand, in this embodiment of the present invention where the phase difference is 90 degrees, the difference between the incident angle and the half angle of view is only 5 to 10 degrees. The incident light and the scanning light having a small difference between the angles are necessary to be separated from each other.

Because the difference between the incident light and the scanning light is small, it is difficult to separate the incident light from the scanning light in a vicinity of the optical deflector 7 as shown in the figure. If the incident mirrors 2, 2' are forcedly disposed close to the optical deflector 7, there is a possibility that a part of the scanning light fails to enter the surface to be scanned due to the incident mirrors.

That is, since the incident mirror is disposed close to the scan lens, a position where the mirror is disposed is limited so that the degree of layout freedom is small. Accordingly, in the embodiment of the present invention, a distance from a point of the first scan lens 8 closest to the optical deflector 7, where the thickness of the first scan lens 8 is thickest, to an end of the first scan lens 8, which is close to an opposite side to a side where the light beam is incident, that is, an opposite side to a side of the light source is longer than that of the side of the light source. In other words, a relationship of La>Lb is set in FIG. 7. According to the above configuration, places where the incident mirrors 2, 2' are put increases so that the layout freedom of the optical systems on the light source side is increased.

In addition, the first scan lens can have at least one assembling standard which defines an assembling position on both surfaces in the sub scanning direction. A section of the first scan lens 8 in the sub scanning direction is shown on the lower side of FIG. 7. In this configuration, the first scan lens which is disposed on opposite sides of the optical deflector 7 is provided with assembling standards to define an assembling position. The first scan lenses used at both sides of the optical deflector are preferably commonly-used to reduce cost, and therefore the first scan lens has assembling standards on both sides thereof in the sub scanning direction. Since the assembling standards are provided on both sides of the first scan lens, the first scan lens can be assembled in a reversed state on the opposite side of the optical deflector and assembling accuracy can be achieved.

Figure 8:
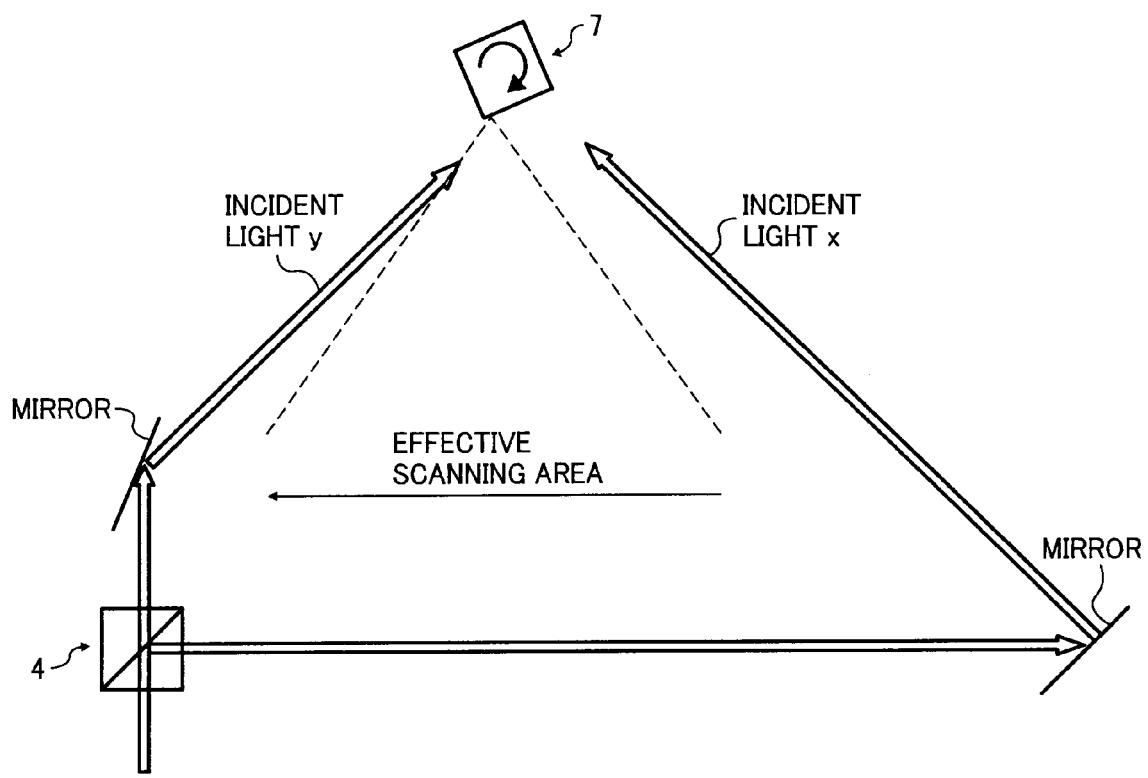
FIG. 8 is an explanatory view explaining a problem occurring when divided light beams are emitted onto the same reflection surface of an optical scanner.

In addition, although, as shown in FIG. 8, the incident light x, y emitted from the commonly-used light source and divided by the half-mirror prism 4 can enter the same reflection surface of the optical deflector 7, the light beams are required to be folded over the scanning areas by a mirror, so that the layout property is degraded. Furthermore, when the light beams enter the same reflection surface of the optical deflector 7, the divided light fluxes are required to enter the optical deflector 7 from different positions in the sub scanning direction so that the position of each light beam is required to be changed in the sub scanning direction by the half-mirror prism 4 and the mirror. Accordingly, as shown in FIG. 4, the divided light fluxes are preferably emitted into the different reflection surfaces of the optical deflector 7 to increase the layout property.

Figure 9:
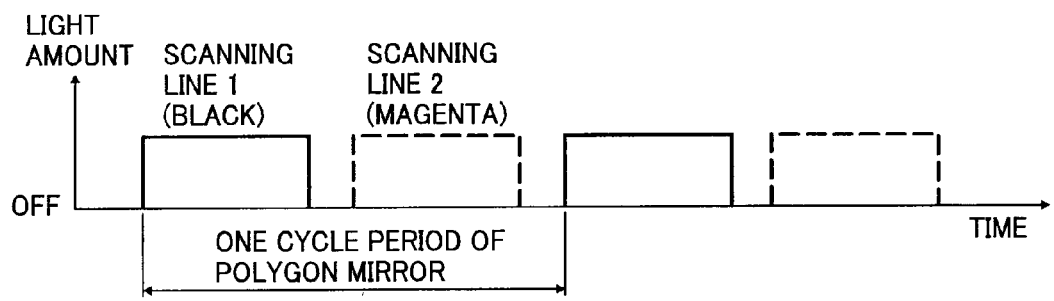
FIG. 9 is a timing chart of exposure for a plurality of colors.

FIG. 9 is a timing chart of exposures of a plurality of colors. In this figure, a vertical axis and a horizontal axis indicate a light amount and time, respectively.

As described above, the light beam emitted from the commonly-used light source and divided by the half-mirror prism 4 is deflected by the optical deflector 7 to scan and expose the two photoconductor 11a, 11b, for example, the photoconductors corresponding to black and magenta. The solid line and the dotted line correspond to black and magenta, respectively. A timing to start writing on the photoconductor corresponding to black or magenta is determined by detecting the scanning beam through the synchronization detector such as the synchronization detection sensor disposed out of the effective scanning area. Moreover, although the synchronization detector is not shown in FIG. 4, the synchronization detection sensor using a light-receiving element such as a photodiode, or the like is normally used as shown in FIG. 1.

Figure 10:
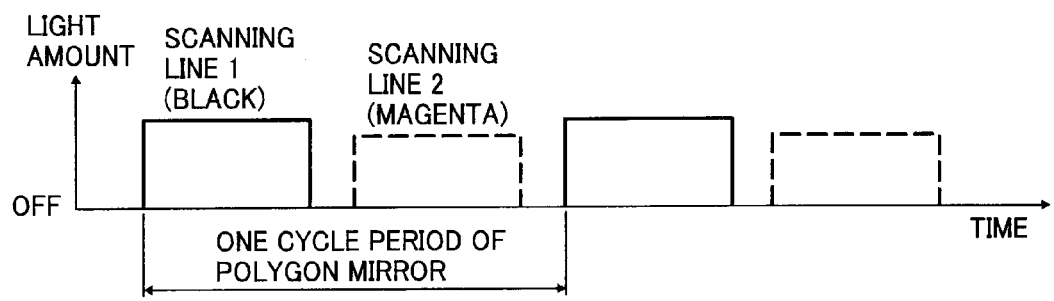
FIG. 10 is a timing chart of exposure in which a light amount is changed depending on colors.

FIG. 10 is a timing chart in which an exposure light amount differs depending on the colors. Although in FIG. 9 the light amounts of the photoconductors corresponding to black and magenta are set to be equal to each other, light transmission and light reflectance of the optical elements are actually relatively different. If the light amounts of the light source when the photoconductor corresponding to black is scanned and when that corresponding to magenta are equal to each other, the light amounts of the light beam achieved on the photoconductors differ from each other. Accordingly, the set light amounts to scan the different photoconductors differ from each other as shown in FIG. 10 so that different photoconductors can be scanned with the light beams having the same light amount on the surfaces of the photoconductors.

Each light beam emitted from the two light sources 1, 1' shown in FIG. 4 is divided by the half-mirror prism 4 and emitted to each of the photoconductors 11a, 11b so that two scanning lines are formed on the photoconductors 11a, 11b in a scanning. At this time, a pitch of the scanning line in the sub scanning direction is required to be adjusted depending on a pixel density. As a well-known method to adjust the pitch in the sub scanning direction, there is a method in which a light source unit including light sources 1, 1', coupling lenses 3, 3', and an aperture 12 is rotated about an axis perpendicular to the main scanning direction and the sub scanning direction. In this case, although the pitch can be adjusted to be a desired pitch in one photoconductor, in another photoconductor, shape errors and assembling errors in optical elements after the light-flux dividing unit 4 such as a half-mirror prism occur so that errors in the pitch occur.

In order to solve the above disadvantage, it is necessary to provide an adjusting unit to adjust the pitch in the sub scanning direction between the light-flux dividing element (half-mirror prism) 4 and the optical deflector 7.

Figure 11A:
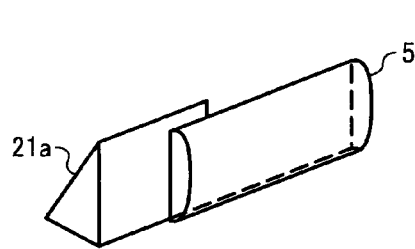
FIGS. 11A and 11B are views illustrating examples of a pitch adjusting unit.
Figure 11B:
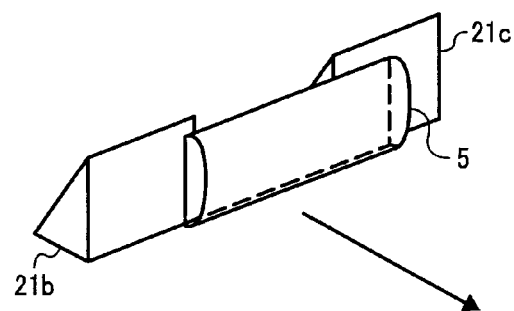

FIGS. 11A and 11B are views illustrating examples of the pitch adjusting unit. FIG. 11A shows a one-side adjusting unit and FIG. 11B shows a both-side adjusting unit.

As an example, a cylindrical lens 5 is disposed in a housing (not shown) of the optical scanner via an intermediate member 21a (or intermediate members 21b, 21c). A hardening resin, for example, light-hardening resin is preliminarily applied to attached surfaces of the cylindrical lens 5 or/and the intermediate member 21a (or 21b, 21c). At this time, the intermediate member 21a (or 21b, 21c) is disposed so as to adjust decentering about an axis parallel to the main scanning direction and to perform adjustment in the optical axis direction in relation to the housing. At least one adjustable direction of the intermediate member 21a (or 21b, 21c) in relation to the housing and at least one adjustable direction of the cylindrical lens 5 in relation to the intermediate member (or 21b, 21c) are different from each other. According to the above-described configuration, a plurality of optical properties such as reduction of a beam waist fattening and a beam waist positional deviation, reduction of a beam spot positional deviation and the like, can be obtained at once. Furthermore, when the cylindrical lens 5 is disposed so as to adjust the decentering about the axis parallel to the optical axis, intervals in the scanning line in the sub scanning direction can be optimally set. In addition, a surface contacting with the cylindrical lens 5 and a surface contacting with the housing of the intermediate member 21a are parallel to each other so that it is easy to perform the adjustment. When the adjustment is completed, the hardening resin is hardened by a predetermined method, for example, by an ultraviolet irradiation so that the mutual positions are fixed.

Figure 12A:
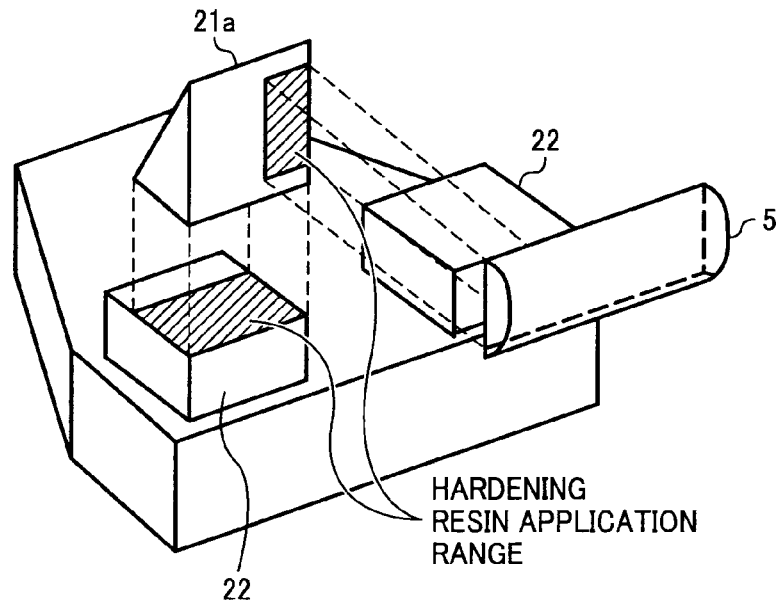
FIGS. 12A and 12B are views illustrating examples of adjusting methods to adjust a pitch.
Figure 12B:
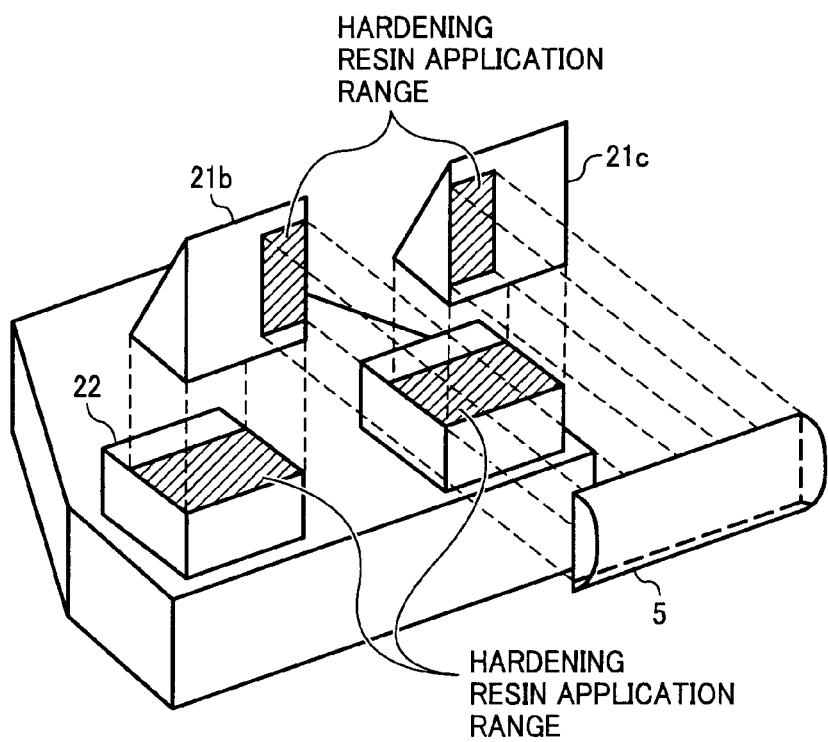

FIGS. 12A and 12B are views illustrating examples of actual adjusting methods. FIG. 12A shows a one-side adjustment and FIG. 12B shows a both-side adjustment.

The cylindrical lens 5 is held by a jig and is moved in a direction necessary to be adjusted in a position on the optical axis, a decentering about the axis parallel to the optical axis, and/or a position in the sub scanning direction in this embodiment. After that, the intermediate member 21a (21b, 21c) to which the hardening resin, for example, an ultraviolet-hardening resin is applied is pressed onto the cylindrical lens 5 and a base 22 of the housing and then the applied ultraviolet-hardening resin is irradiated with an ultraviolet to fix the cylindrical lens 5. According to the above configuration, it is easy to adjust the optical systems in plural directions. If the intermediate member 21a (21b, 21c) is made of transparent material, the ultraviolet-hardening resin is easily hardened.

In addition, although it is possible to hold the optical element such as the cylindrical lens 5, and the like by the one intermediate member 21a as shown in FIG. 11A, it is also possible to hold the optical element by the two intermediate members 21b, 21c disposed on opposite sides of the light beam. According to this configuration, if linear expansion coefficients of the housing and the intermediate member 21, for example, in a case where resins are used for the housing and/or the intermediate members, are different from each other, when the temperature increases, stresses are generated in a symmetrical manner with respect to the optical axis so that postural change of the optical elements becomes small.

In general, an auto power control (APC) is performed in the semiconductor laser to stabilize light output. In the APC, light output of the semiconductor laser is monitored by a light-receiving element such as a photodiode (PD) or the like, and forward current of the semiconductor laser is controlled to be at a desired value based on a detection signal of a current occurring when the light-receiving element receives light, which is proportional to the light output of the semiconductor laser.

If the semiconductor laser is an edge emitting semiconductor laser, the photodiode as the light-receiving element is generally used to monitor light exiting in an opposite direction to a direction where light exits toward the coupling lens. However, in this case, when the APC is performed, unnecessary ghost light is emitted into the light-receiving element, the light amount detected by the light-receiving element increases.

For example, in a case where an incident angle of a light beam emitted into the reflection surface of the optical deflector 7 is 0, if the APC is performed at this position, the light beam reflected on the reflection surface returns to the light source because the reflection surface is opposite to the light source. Therefore, the light amount to be detected by the light-receiving element increases. Accordingly, it is set not to perform the APC when the incident angle is 0. According to the above configuration, it is possible to output an image having an appropriate density without density variation.

Figure 13:
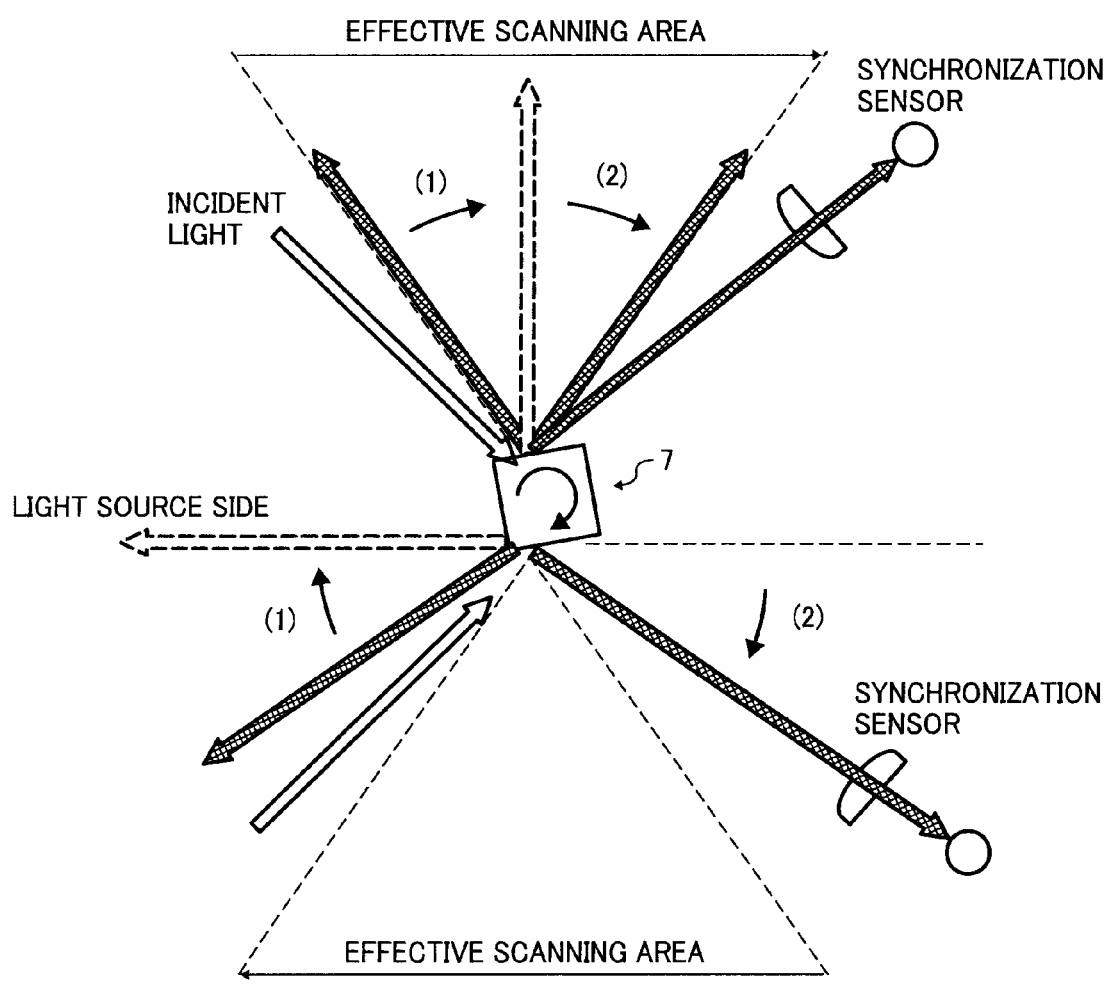
FIG. 13 is an explanatory view illustrating disposed positions of synchronization detectors.

As the synchronization detector, a light-receiving element is disposed on a light path extending out of the effective scanning area to detect the scanning light and to determine a writing start position. As shown in FIG. 7, in this system, since the difference between angles of the incident light to the optical deflector (polygon mirror) 7 and the scanning light is small, a positional range where the light-receiving element is disposed on the light source side is limited and layout freedom is small. Accordingly, in an embodiment of the present invention, as shown in FIG. 13, the two light-receiving elements as the synchronization detectors are disposed on opposite sides of the polygon mirror 7 in relation to the corresponding light sources so that the layout freedom increases compared to the case where the light-receiving element is disposed on the light source side.

The above-described arts are also effective when the light source is formed by integrated surface-emitting semiconductor lasers. For example, if forty channels of the surface-emitting semiconductor lasers are used, two light sources can serve forty channels of light beams in four colors so that cost of the light sources can be reduced as well as high speed in forty beam writings being ensured.

Figure 14:
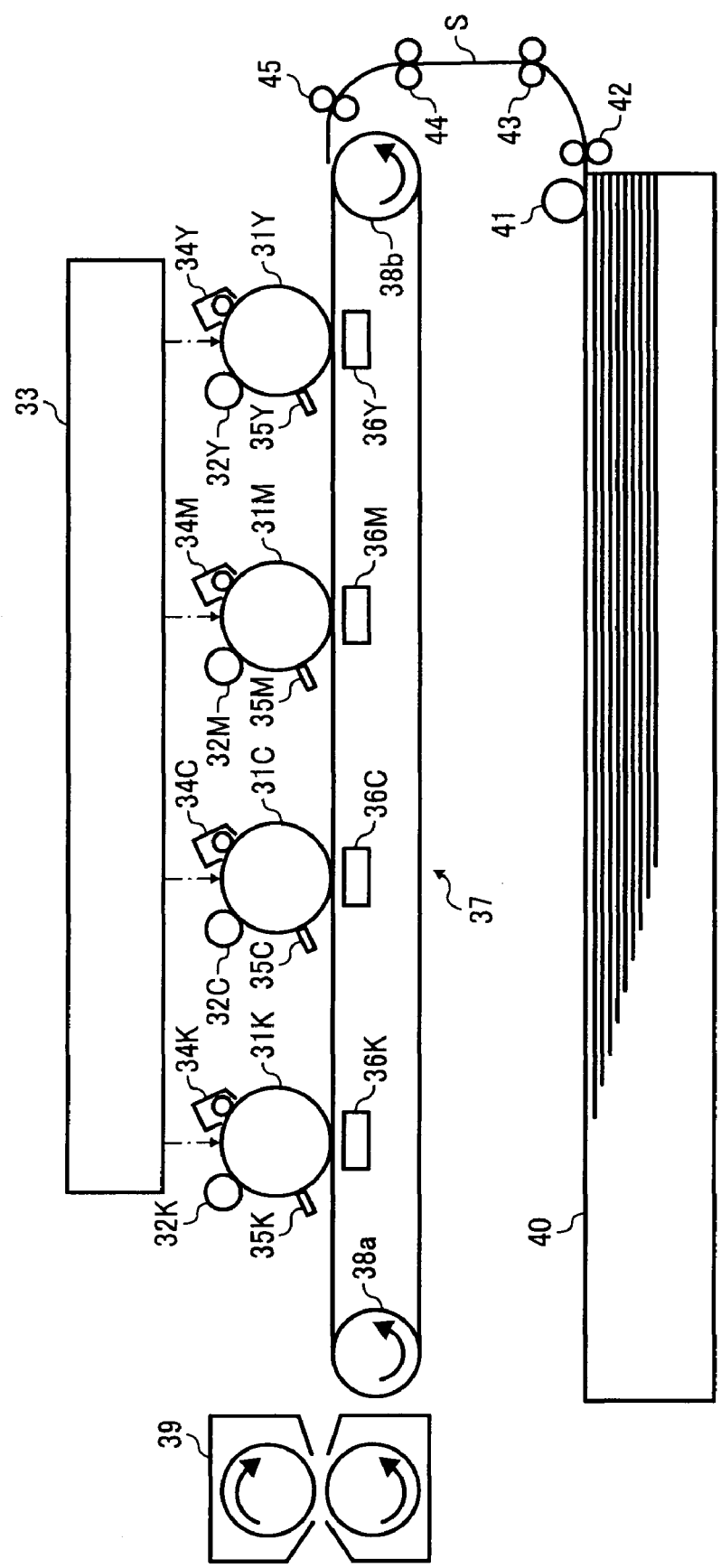
FIG. 14 is a schematic configuration diagram of an image forming apparatus according to an embodiment of the present invention.

Next, a configuration example of the image forming apparatus having the optical scanner according to an embodiment of the present invention as a writing unit is described. FIG. 14 is a schematic configuration diagram illustrating the image forming apparatus as an example of the present invention. The image forming apparatus includes at least one image carrier 31 such as a photoconductor, at least one charging unit 32 configured to charge the at least one photoconductor 31, a writing unit 33 having an optical scanner according to an embodiment of the present invention having at least one light source which is driven to modulate a light beam based on image information and is configured to emit the modulated light beam onto the at least one photoconductor 31 to form a latent image on the at least one photoconductor 31, at least one development unit 34 configured to develop the latent image formed on the photoconductor 31 with a toner to visualize the latent image as a toner image, at least one cleaning unit 35 configured to remove toner remaining on the photoconductor 31 after transfer, at least one transfer unit configured to transfer the toner image directly or via an intermediate transfer body onto a recording medium, and a fixing unit configured to fix the toner image transferred on the recording medium and a fixing unit 39 configured to fix the toner image transferred on the recording medium. The transfer unit includes, for example, a transfer charging unit 36 configured to charge the latent image on the photoconductor 31 to the recording medium, and a transfer belt 37 configured to feed the recording medium. The image forming apparatus further includes driving and driven rollers 38a, 38b configured to support the transfer belt 37 in a stretched state, a paper cassette 40 to contain sheet-like recording media S such as recording paper, a feeding roller 41 configured to feed the recording media S, a separation unit 42 configured to separate one by one the recording media fed from the feeding roller 41, conveying rollers 43, 44 configured to convey the recording medium S, and resist rollers configured to feed the recording medium S to the transfer belt 37 so as to match a timing of image formation on each photoconductor. Characters Y, M, C, K attached to reference numbers indicate yellow, magenta, cyan, and black, respectively.

The four photoconductors 31Y, 31M, 31C, 31K are disposed in parallel along the transfer belt 37, and rotated in an anti-clockwise direction. Each photoconductor 31Y, 31M, 31C, 31K is provided with the charging unit 32Y, 32M, 32C, 32K, the development unit 34Y, 34M, 34C, 34K, the transfer charging unit 36Y, 36M, 36C, 36K, and cleaning unit 35Y, 35M, 35C, 35K, in order in the rotational direction.

The charging unit 32Y, 32M, 32C, 32K is used to uniformly charge a surface of the photoconductor, and a charging member of the charging unit can be formed in a roller form or brush form as used in a contact-type charging method, or a non-contact charging member can be used. The light beam is emitted on the surface of the photoconductor between the charging unit 32Y, 32M, 32C, 32K and the development unit 34Y, 34M, 34C, 34K by the writing unit 33 to form the latent image on the photoconductor 31Y, 31M, 31C, 31K. The toner image corresponding to each of the colors Y, M, C, K is formed on the photoconductor based on the latent image by the development unit 34Y, 34M, 34C, 34K. The toner image corresponding to each of the colors Y, M, C, K is subsequently transferred in a superimposed state on the recording paper S fed by the transfer belt 37 and then the image is fixed on the recording paper S by the fixing unit 39.

In addition, although in the optical scanner shown in FIG. 4, only two photoconductors 11a, 11b are shown, in the writing unit 33 of the image forming apparatus shown in FIG. 14, the optical scanner having, in addition to the optical systems shown in FIG. 4, further scanning optical systems which are the same as those shown in FIG. 4 symmetrically disposed at an opposite side of the optical deflector (polygon mirror) 7 (see FIG. 1) is used. According to the above configuration, the four photoconductors 31Y, 31M, 31C, 31K corresponding to each of the four colors can be scanned.

Next, particular data of optical systems in the optical scanner according to the embodiment of the present invention, which is shown in FIG. 4, is as follows.

Wavelength of the light sources 1, 1': 655 nm
Focal length of the coupling lenses 3, 3': 15 mm
Coupling effect: collimate effect
Polygon mirror 7
number of reflection surfaces : 4
radius of an inscribed circle: 7 mm The cylindrical lenses 5a, 5b (5c, 5d) having a focal length of 110 mm are disposed between the half-mirror prism 4 as the light-flux dividing unit and the polygon mirror as the optical deflector 7 to form a line image extending in the main scanning direction in the vicinity of the reflection surface of the optical deflector 7.

Lens data of optical systems after the deflector is as follows.

First surfaces of the first scan lenses 8a, 8b, which face the optical deflector, and both surfaces of the second scan lenses 10a, 10b are described by the following equations (1), (2).

—Expression to Define Noncircular Arcs in the Main Scanning Direction

A surface shape of the optical elements in a plane along the main scanning direction is in a noncircular arc form, and the depth X in the optical axis is described by the following polynomial expression (1).

$$X = (Y^2/Rm)/[1 + \sqrt{1 - (1+K)(Y/Rm)^2}] + \qquad (1)$$
$$A1 \cdot Y + A2 \cdot Y^2 + A3 \cdot Y^3 + A4 \cdot Y^4 + A5 \cdot Y^5 + A6 \cdot Y^6 + \ldots$$

where Rm is the paraxial radius of curvature in the optical axis in the plane along the main scanning direction, Y is the distance from the optical axis in the main scanning direction, K is conical constant, and A1, A2, A3, A4, A5, A6, . . . are coefficients for the higher order terms.

If the coefficients of odd-numbered terms A1, A3, A5, . . . , are substituted by non-zero numbers, the form specified by the expression becomes asymmetric with respect to the main scanning direction.

Since only even-numbered terms with coefficients, A2, A4, A6, . . . , are used in this embodiment, the shape of the optical elements becomes symmetric in the main scanning direction.

—Expression to Define Noncircular Arcs in the Sub Scanning Direction

The curvature in the sub scanning direction changes as described in the following polynomial expression (2).

$$Cs(Y) = 1/Rs(0) + B1 \cdot Y + B2 \cdot Y^2 + B3 \cdot Y^3 + B4 \cdot Y^4 + B5 \cdot Y^5 + \ldots \qquad (2)$$

where Cs(Y) is the curvature in the sub scanning direction, Rs(0) is the curvature in the optical axis in the sub scanning direction, and B1, B2, B3, B4, B5, . . . are aspheric coefficients for the higher order terms.

If the coefficients of odd-numbered terms B1, B3, B5, . . . are substituted by non-zero numbers, the curvature in the sub scanning direction becomes asymmetric with respect to the main scanning direction.

The second surface of the first scan lens is formed in a rotationally-symmetric aspheric form and described by the following polynomial expression (3).

—Expression to Define Rotationally-Symmetric Aspheric Surface.

The depth X in the optical axis is described by the following polynomial expression (3).

$$X = (Y^2/Rm)/[1 + \sqrt{1 - (1+K)(Y/Rm)^2}] + \qquad (3)$$
$$A1 \cdot Y + A2 \cdot Y^2 + A3 \cdot Y^3 + A4 \cdot Y^4 + A5 \cdot Y^5 + A6 \cdot Y^6 + \ldots$$

where Rm is the paraxial radius of curvature in the optical axis, Y is the distance from the optical axis in the main scanning direction, K is conical constant, and A1, A2, A3, A4, A5, A6, . . . are coefficients for the higher order terms.

The formation of the first surface of the first scan lens is as follows.
Rm=−279.9, Rs=−61.0
K=−2.900000E+01
A4=1.755765E−07
A6=−5.491789E−11
A8=1.087700E−14
A10=−3.183245E−19
A12=−2.635276E−24
B1=−2.066347E−06
B2=5.727737E−06
B3=3.152201E−08
B4=2.280241E−09
B5=−3.729852E−11
B6=−3.283274E−12
B7=1.765590E−14
B8=1.372995E−15
B9=−2.889722E−18
B10=−1.984531E−19

The formation of the second surface of the first scan lens is as follows.
R=−83.6
K=−0.549157
A4=2.748446E−07
A6=−4.502346E−12
A8=−7.366455E−15
A10=1.803003E−18
A12=2.727900E−23

The formation of the first surface of the second scan lens is as follows.
Rm=6950, Rs=110.9
K=0.000000+00
A4=1.549648E−08
A6=1.292741E−14
A8=−8.811446E−18
A10=−9.182312E−22
B1=−9.593510E−07
B2=−2.135322E−07
B3=−8.079549E−12
B4=2.390609E−12
B5=2.881396E−14
B6=3.693775E−15
B7=−3.258754E−18
B8=1.814487E−20
B9=8.722085E−23
B10=−1.340807E−23

The formation of the second surface of the second scan lens is as follows.
Rm=766, Rs=−68.22
K=0.000000+00
A4=−1.150396E−07
A6=−1.096926E−11
A8=−6.542135E−16
A10=1.984381E−20
A12=−2.411512E−25
B2=3.644079E−07
B4=−4.847051E−13

B6=−1.666159E−16
B8=4.534859E−19
B10=−2.819319E−23

The refractive index of all of the scan lenses in the used wavelength is 1.52724.

The optical arrangement is as follows.

The distance d1 from the reflection surface of the deflector to the first surface of the first scan lens: 64 mm.

The center thickness d2 of the first scan lens: 22.6 mm.

The distance d3 from the second surface of the first scan lens to the first surface of the second scan lens: 75.9 mm.

The center thickness d4 of the second scan lens: 4.9 mm.

The distance d5 from the second surface of the second scan lens to the surface to be scanned: 158.7 mm.

In addition, in the optical scanner shown in FIG. 4, the soundproof glass 6 and a not-shown dust-proof glass having the refractive index of 1.514 and the thickness of 1.9 mm are disposed, and in order to prevent ghost light from generating, the soundproof glass 6 is disposed so as to incline with 10 degrees in relation to a direction parallel to the main scanning direction in a rotary deflection plane.

Furthermore, the dust-proof glass is not shown but disposed between the second scan lens 10a, 10b and the surface 11a, 11b to be scanned.

In the optical scanner according to an embodiment of the present invention, the pairs of scanning optical systems are disposed on opposite sides of the optical deflector. In the pair of the scanning optical systems, one scanning optical system has the synchronization detector to determine the scanning timing after the scanning is performed, and the other scanning optical system has the synchronization detector to determine the scanning timing before the scanning is performed. Accordingly, the required exposed width in the pair of scanning optical systems can be reduced so that a small size apparatus and optical deflector can be achieved. Thereby, the small-size and low-cost optical scanner can be obtained while ensuring the optical properties.

In the optical scanner according to an embodiment of the present invention, the synchronization detectors are disposed at opposite sides of the optical deflector so that layout freedom can be increased while the effective scanning area is ensured and a small-size and low-cost optical scanner can be obtained.

In the optical scanner according to an embodiment of the present invention, the pair of optical scanners have the synchronization detectors by which the timings from the detection to the writing start are different from each other. Thereby, the interval from the detection to the writing start in each color can be set to the optimal value in each color, so that variations of the writing start position in the colors can be reduced. Accordingly, the optical scanner where high-quality images are formed can be obtained.

In the optical scanner according to an embodiment of the present invention, in the synchronization detection performed at the scanning end side, the synchronization timing in each of the reflection surfaces of the optical deflector is preliminarily memorized and determines the writing timing of the next reflection surface. The intervals of the synchronization detections are memorized and the lengths of the reflection surfaces of the optical deflector are preliminarily calculated so that even in a case where the synchronization detection is performed after the writing to determine the timing to write the next reflection surface, the writing start position is not affected by variations in the reflection surfaces and the optical scanner which forms high-quality images can be obtained.

In the optical scanner according to an embodiment of the present invention, the light-flux dividing unit is disposed between the light source and the optical deflector to emit the light fluxes having the phase difference of $\pi/2$ from each other to the optical deflector. When the optical deflector is a polygon mirror having four reflection surfaces, the light flux is divided by the light-flux dividing unit such as a half mirror, that is to say, the writing in two stations can be performed using only one light source. Accordingly, the number of light sources having a high cost ratio can be reduced to a half while optical properties equal to those obtained in the conventional case are ensured. The above configuration is particularly effective when an LD array or a surface-emitting laser by which a plurality of light beams are emitted from one light source is used as the light source. Accordingly, the optical scanner where high-speed writing, high-quality image, and low cost are achieved can be obtained.

In the optical scanner according to an embodiment of the present invention, the distance from the thickest portion of the scan lens disposed to be closest to the optical deflector to the end portion of the scan lens to the end portion of the scan lens, which is disposed at the light source side, from a vicinity of which the light beam is emitted is less than the distance from the thickest portion of the scan lens to the opposite end portion of the scan lens. Accordingly, the positional range where the incident mirror is disposed at the light source side becomes large so that layout freedom increases and a small-size and low-cost optical scanner can be obtained.

In the optical scanner according to an embodiment of the present invention, the scan lens has the at least one assembling standard which defines the assembling position on both surfaces in the sub scanning direction so that the low-cost optical scanner can be obtained. That is, since the scan lenses disposed at opposite sides of the optical deflector are preferably commonly used, both surfaces of each of the scan lenses in the sub scanning direction are provided with the assembling standards so that the scan lens can be accurately attached even when the scan lens is reversed. Thereby, the scan lens can be used in each of the optical systems disposed at the opposite sides so that cost can be reduced.

In the image forming apparatus according to an embodiment of the present invention, the writing unit includes the optical scanner according to one of the above embodiments of the present invention so that the low-cost image forming apparatus can be obtained while high-speed and high quality images are ensured.

The image forming apparatus according to an embodiment of the present invention further includes the plurality of image carriers and the latent images formed on the image carriers by the optical scanner are respectively developed by the development units corresponding to different colors to be visualized as the toner images. The toner images are transferred in a superimposed state on the recording medium directly or via the intermediate transfer body and fixed onto the recording medium by the fixing unit to form the multi-color or full-color image. Thereby, the low-cost image forming apparatus can be obtained while high speed and high quality are ensured.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An optical scanner, comprising:
a plurality of scanning optical systems each of which scans a different surface to be scanned and, each scanning optical system includes, a light source configured to emit a light beam, and
a synchronization detector; and
an optical deflector having a plurality of reflection surfaces each reflecting the light beam emitted from the light source to scan the surface, the optical deflector being commonly used in the plurality of scanning optical systems,
wherein the synchronization detector of each scanning optical system is configured to receive the light beam deflected by the optical deflector and detect a timing to scan an effective area of the surface to be scanned with the deflected light beam before a scanning is started or after the scanning is completed,
each of the plurality of scanning optical systems has at least one lens,
the synchronization detector of each scanning optical system is positioned on a side of the optical deflector opposite to the light source with respect to a plane which passes through a longitudinal center of the at least one lens of one scanning optical system and a longitudinal center of the at least one lens of another scanning optical system, the plane being parallel to a rotational axis of the optical deflector, and no synchronization detectors being positioned on a same side as the light source with respect to the plane which passes through the longitudinal centers of the lenses,
the plurality of scanning optical systems include at least one pair of scanning optical systems disposed on opposite sides of the optical deflector to each other, and
the synchronization detector of one of the pair of scanning optical systems is disposed on a scanning end side where the scanning of the effective area of the surface to be scanned is finished to determine the scanning timing, and the synchronization detector of the other one of the pair of scanning optical systems is disposed on a scanning start side where the scanning of the effective area of the surface to be scanned is started to determine the scanning timing, wherein
each of the plurality of scanning optical systems includes a light-flux dividing unit which is disposed between the light source and the optical deflector and is configured to divide light flux of the light beam emitted from the light source into a plurality of light fluxes, and a plurality of mirrors configured to reflect the plurality of light fluxes, respectively, from the light dividing unit such that the plurality of light fluxes enter the respective reflection surfaces of the optical deflector to have an angle of $\pi/2$ in a plane that is perpendicular to the rotational axis of the optical deflector.

2. The optical scanner according to claim 1, wherein the synchronization detectors of the pair of scanning optical systems are disposed on opposite sides of the optical deflector in a symmetrical state with respect to a plane which passes through a rotational center of the optical deflector and is parallel to the surfaces to be scanned.

3. The optical scanner according to claim 1, wherein the synchronization detectors of the pair of the scanning optical systems determine timings from the synchronization detection to writing, which are different from each other.

4. The optical scanner according to claim 1, wherein a synchronization timing of each reflection surface of the optical deflector is stored to determine a timing of writing with a next reflection surface in the synchronization detection performed at the scanning end side.

5. The optical scanner according to claim 1, wherein the scanning optical system is a scan lens configured to collect the light beam deflected by the optical deflector onto the surface to be scanned;
the scan lens has a thickest portion and end portions respectively disposed close to a scanning start part and a scanning end part of the surface to be scanned; and
a distance from the thickest portion of the scan lens to the end portion of the scan lens which is disposed close to the scanning start part is less than a distance from the thickest portion of the scan lens to an opposite end portion of the scan lens which is close to the scanning end part.

6. The optical scanner according to claim 5, wherein the scan lens has at least one assembling standard which defines an assembling position on both surfaces in a sub scanning direction.

7. An image forming apparatus, comprising:
at least one image carrier; and
a writing unit including an optical scanner, including,
a plurality of scanning optical systems each of which scans a different surface to be scanned and, each of the scanning optical system includes,
a light source configured to emit a light beam, and
a synchronization detector, and
an optical deflector having a plurality of reflection surfaces each reflecting the light beam emitted from the light source to scan the surface, the optical deflector being commonly used in the plurality of scanning optical systems,
wherein the synchronization detector of each scanning optical system is configured to receive the light beam deflected by the optical deflector and detect a timing to scan an effective area of the surface to be scanned with the deflected light beam before a scanning is started or after the scanning is completed,
each of the plurality of scanning optical systems has at least one lens,
the synchronization detector of each scanning optical system is positioned on a side of the optical deflector opposite to the light source with respect to a plane which passes through a longitudinal center of the at least one lens of one scanning optical system and a longitudinal center of the at least one lens of another scanning optical system, the plane being parallel to the rotational axis of the optical deflector, and no synchronization detectors being positioned on a same side as the light source with respect to the plane which passes through the longitudinal centers of the lenses,
the plurality of scanning optical systems include at least one pair of scanning optical systems disposed on opposite sides of the optical deflector to each other,
the synchronization detector of one of the pair of scanning optical systems is disposed on a scanning end side where the scanning of the effective area of the surface to be scanned is finished to determine the scanning timing, and the synchronization detector of the other one of the pair of scanning optical systems is disposed on a scanning start side where the scanning of the effective area of the surface to be scanned is started to determine the scanning timing, wherein
each of the plurality of scanning optical systems includes a light-flux dividing unit which is disposed between the light source and the optical deflector and is configured to divide light flux of the light beam emitted from the light source into a plurality of light fluxes, and a plurality of mirrors configured to reflect the plurality of light fluxes, respectively, from the light dividing unit such that the plurality of light fluxes enter the respective reflection surfaces of the optical deflector to have an angle of $\pi/2$ in a plane that is perpendicular to the rotational axis of the optical deflector, and the optical deflector is a polygon mirror having four reflection surfaces, at least one of the light sources is driven based on image information, and the writing unit is configured to emit at least one of the light beams onto the at least one image carrier to form a latent image on the at least one image carrier.

8. The image forming apparatus according to claim 7, further comprising:

at least one development unit configured to develop the latent image formed on the image carrier with a toner to visualize the latent image as a toner image;

at least one transfer unit configured to transfer the toner image directly or via an intermediate transfer body onto a recording medium; and a fixing unit configured to fix the toner image transferred on the recording medium.

9. The image forming apparatus according to claim 8, comprising a plurality of image carriers which include a plurality of development units, wherein the latent image is formed on each of the plurality of image carriers by the optical scanner, and developed and visualized as the toner image by each of the plurality of development units of different color;

the toner images of different colors formed on each of the plurality of the image carriers are transferred in a superimposed state directly or via the intermediate transfer body onto the recording medium by the transfer unit; and the toner images transferred onto the recording medium are fixed by the fixing unit to form a multi-color or full-color image.

* * * * *